United States Patent
Kim

(10) Patent No.: US 9,666,390 B2
(45) Date of Patent: May 30, 2017

(54) KEYBOARD CONTAINING KEYS HAVING SEQUENTIAL SWITCHING CAPACITIES

(71) Applicant: Dong Z. Kim, Bayside, NY (US)

(72) Inventor: Dong Z. Kim, Bayside, NY (US)

( * ) Notice: Subject to any disclaimer, the term of this patent is extended or adjusted under 35 U.S.C. 154(b) by 17 days.

(21) Appl. No.: 14/796,354

(22) Filed: Jul. 10, 2015

(65) Prior Publication Data

US 2016/0247642 A1    Aug. 25, 2016

Related U.S. Application Data

(60) Provisional application No. 62/120,764, filed on Feb. 25, 2015.

(51) Int. Cl.
| | | |
|---|---|---|
| *H01H 9/00* | (2006.01) | |
| *H01H 13/704* | (2006.01) | |
| *G06F 3/02* | (2006.01) | |

(52) U.S. Cl.
CPC ......... *H01H 13/704* (2013.01); *G06F 3/0219* (2013.01); *H01H 2215/002* (2013.01); *H01H 2217/036* (2013.01); *H01H 2225/002* (2013.01); *H01H 2225/004* (2013.01)

(58) Field of Classification Search
CPC .. H01H 13/70; H01H 13/7057; H01H 13/503; H01H 13/64; H01H 13/66; H01H 2225/002; H01H 2225/004
USPC ..................................... 200/1 B, 512; 341/34
See application file for complete search history.

(56) References Cited

U.S. PATENT DOCUMENTS

| | | | | |
|---|---|---|---|---|
| 4,771,139 A | * | 9/1988 | DeSmet | H01H 13/807 200/304 |
| 5,675,329 A | | 10/1997 | Barker et al. | |
| 5,724,031 A | | 3/1998 | Huang | |
| 5,995,026 A | | 11/1999 | Sellers | |
| 6,758,615 B2 | | 7/2004 | Monney et al. | |
| 6,999,009 B2 | * | 2/2006 | Monney | H01H 13/702 341/21 |
| 7,238,896 B2 | * | 7/2007 | Nakayama | H01H 13/807 200/10 |

(Continued)

FOREIGN PATENT DOCUMENTS

| | | |
|---|---|---|
| CA | 2681953 | 4/2010 |
| CN | 86103506 | 12/1987 |

(Continued)

OTHER PUBLICATIONS

Hui Tang, David J. Beebe, Arthur F. Kramer, A multilevel input system with force-sensitive elements, International Journal of Human-Computer Studies, Apr. 2001, pp. 495-507, vol. 54, Issue 4.

(Continued)

*Primary Examiner* — Vanessa Girardi
(74) *Attorney, Agent, or Firm* — Gottlieb, Rackman & Reisman, P.C.

(57) ABSTRACT

A keyboard with at least some double action keys is described. The keyboard includes at least two layers disposed below the keys and the keys are selectively used to make contacts on one layer, or pass through and provide contacts with or on the second layer. All or at least some of the keys of the keyboard can be pushed partially down to generate a first command and can be pushed fully down for generating a second command.

16 Claims, 5 Drawing Sheets

(56) References Cited

U.S. PATENT DOCUMENTS

| | | | |
|---|---|---|---|
| 7,385,530 B2* | 6/2008 | Griffin | H01H 13/84 341/22 |
| 7,417,626 B2 | 8/2008 | Aull et al. | |
| 7,583,206 B2 | 9/2009 | Volckers | |
| 7,977,587 B2 | 7/2011 | Rajagopal et al. | |
| 8,089,010 B2 | 1/2012 | Yang | |
| 8,314,352 B2 | 11/2012 | Huang et al. | |
| 8,314,721 B2* | 11/2012 | Xu | H01H 13/64 200/314 |
| 8,700,829 B2 | 4/2014 | Casparian et al. | |
| 2003/0107555 A1 | 6/2003 | Williams | |
| 2003/0141992 A1 | 7/2003 | Page | |
| 2009/0248908 A1 | 10/2009 | Ahn | |
| 2014/0091857 A1 | 4/2014 | Bernstein | |

FOREIGN PATENT DOCUMENTS

| | | |
|---|---|---|
| CN | 1731326 | 2/2006 |
| CN | 101105718 | 1/2008 |
| CN | 101192106 | 6/2008 |
| CN | 101719019 | 5/2011 |
| CN | 102375546 | 3/2012 |
| CN | 202995638 | 6/2013 |
| CN | 103576886 | 2/2014 |
| CN | 104035571 | 9/2014 |
| DE | 10304704 | 8/2004 |
| JP | 04370617 | 12/1992 |
| KR | 20140109010 | 9/2014 |

OTHER PUBLICATIONS

Staas De Jong, Dunya Kirkali, Hanna Schraffenberger, Jeroen Jillissen, Alwin De Rooij, Arnout Terpstra, One-Press Control: A Tactile Input Method for Pressure-Sensitive Computer Keyboards, CHI 2010: Work-in-Progress (Spotlight on Posters Days 3 & 4), Apr. 14-15, 2010, Atlanta, GA, USA.

Paul H. Dietz, Benjamin Eidelson, Jonathan Westhues and Steven Bathiche, The Applied Sciences Group Microsoft Corporation, A Practical Pressure Sensitive Computer Keyboard, www.microsoft.com, Redmond, WA.

SmallQWERTY, Mobience Inc., www.google.com, Jun. 29, 2013.

\* cited by examiner

KEYBOARD CONTAINING KEYS HAVING SEQUENTIAL SWITCHING CAPACITIES

RELATED APPLICATIONS

This application claims priority to U.S. Provisional Application Ser. No. 62/120,764 filed on Feb. 25, 2015 and incorporated herein by reference in its entirety.

BACKGROUND OF THE INVENTION

A. Field of Invention

This application pertains to a keyboard with multi-position keys determined, for example, by the distance each key travels vertically. The position of each key is determined, and used to generate an appropriate command, for example, for generating alphanumeric characters, or implementing other functions.

B. Description of the Prior Art

Keyboards with mechanical keys have become a ubiquitous and almost universal means of inputting data and/or generating commands for various electronic (normally PC-based) systems. Historically, these keyboards are the direct descendants of the classic manual typewriters developed in the nineteenth century, as demonstrated by their QWERTY layout. They typically include a plurality of buttons (forming the keys) that are arranged in a known two dimensional pattern on a panel, and each button is activated by a user pushing it downward with a finger. In the classic typewriter, each button was connected by a mechanical linkage to an arm with plate bearing an alphanumeric character. In electronic keyboards, as a button is pushed toward its bottom position, it causes an electrical contact to close. This event is sensed by a decoder which then generates an appropriate command for performing a respective action. For example, pushing the button assigned to the letter "a" causes the decoder to issue a command for generating the letter "a" on a PC monitor.

A problem with this arrangement is that the number of keys are severally limited by the size of the keyboard itself. Typically current keyboards may have up to about 109 keys (including the numerical keys). These keyboards are difficult to use, are clumsy and take a large amount of space on a desk. Therefore, various attempts have been made to design smaller keyboards. However, because it is impractical to reduce the size of the keys themselves, the only way to reduce the size of the keyboards is to reduce the number of keys. This resulting reduced keyboards could not provide the same functionality as a full sized keyboards.

Moreover, keyboards are also made to generate characters other than Latin characters, such as Chinese or Japanese characters. These keyboards are fully functional only if they include more than 109 keys, further increasing the size of the keyboards, and making them even more difficult to use.

In other words, while there have been attempts in the past the overcome these problems, they have not been very successful. The present invention provides an easy-to-learn keyboard that requires less number of keys than standard keyboards and can be used to generate special characters or request commands quickly and easily with the activation of a single key. As a result, keyboards can be made that are smaller than existing conventional keyboards without sacrificing any conventional functionalities.

SUMMARY OF THE INVENTION

A keyboard with double action keys is described wherein one or more keys are provided that have at least three positions; a top or non-operational position, a median position obtained by pushing the respective only partially downward and resulting in the generation of a first command, and a full position in which the key is pushed downward below the intermediate position resulting in the generation of a second command.

The invention is preferably implemented using a keyboard body with a top surface, a first and a second layer set disposed below the top surface, and a plurality of key assemblies. The first or top layer set is formed with a plurality of holes, each hole representing a respective position for one of the key assemblies. Both layer sets also have pads or other means forming an electrical contact in response to the activation of the respective key assemblies.

Each key assembly includes at least a key head positioned on the keyboard surface, and first and second activation elements coupled to the key head. When each key head is depressed for a first distance to reach median position, the respective activation element of the key head causes a respective contact to be formed between the layers of the first layer set.

When the key head is depressed further by a predetermined distance to reach the down position, the second activation element of the key head passes through the respective hole of the first layer set and causes a second contact to be formed between the layers of the second layer set.

In one embodiment, the layer sets include two layers with conductive strips and an insulating layer disposed in between.

For all the embodiments, a decoder is provided that receives information on which contacts have been formed by the activation of a key head, and generates a respective code. More specifically, the decoder generates a first command when a key head is depressed by a first distance and a second command when the key head is depressed by a second distance.

In one embodiment, depressing a key by a first distance leads to generation of a lower case alphabetic character while activating the same key by pushing it down by the second distance leads to the generation of the same character in the upper case.

The activation of some of the keys to the intermediate or down positions causes first or second functionalities to be initiated by the keyboard.

A keyboard is also provided in which the key assemblies are arranged in novel configurations in which some symbols are assigned to an alphabetic key mnemonically associated therewith.

DETAILED DESCRIPTION OF THE INVENTION

Figure 1:
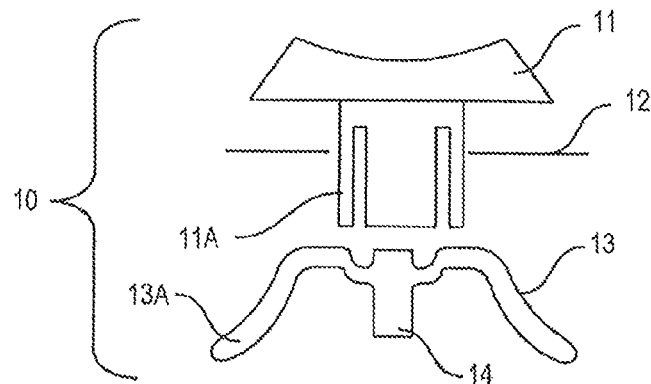
FIG. 1 shows a side view of a conventional key assembly for a keyboard.
Figure 2:
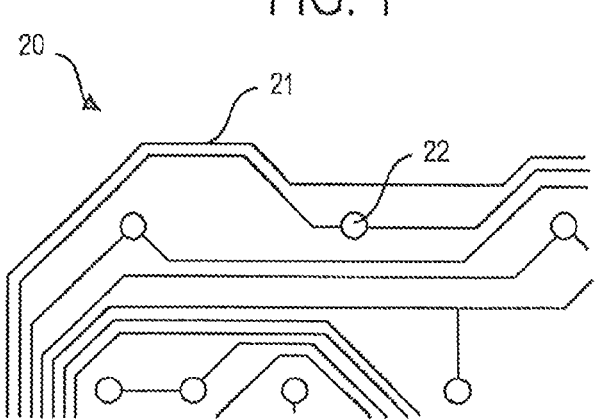
FIG. 2 shows a partial plan view of a conventional plastic circuit layer for a keyboard.
Figure 3:
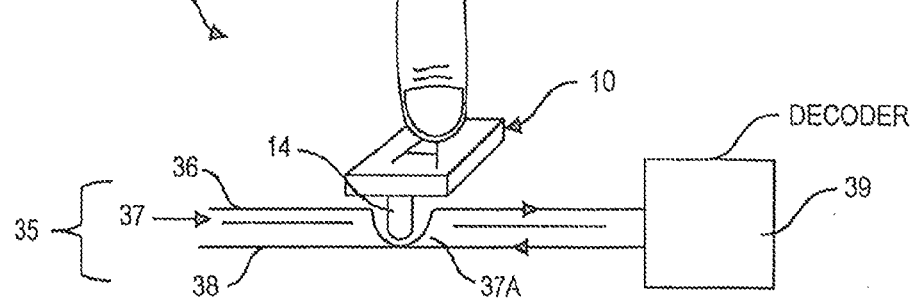
FIG. 3 shows a side view of a key assembly used to selectively close a contact between the two conventional circuit layers of a keyboard.
Figure 6:
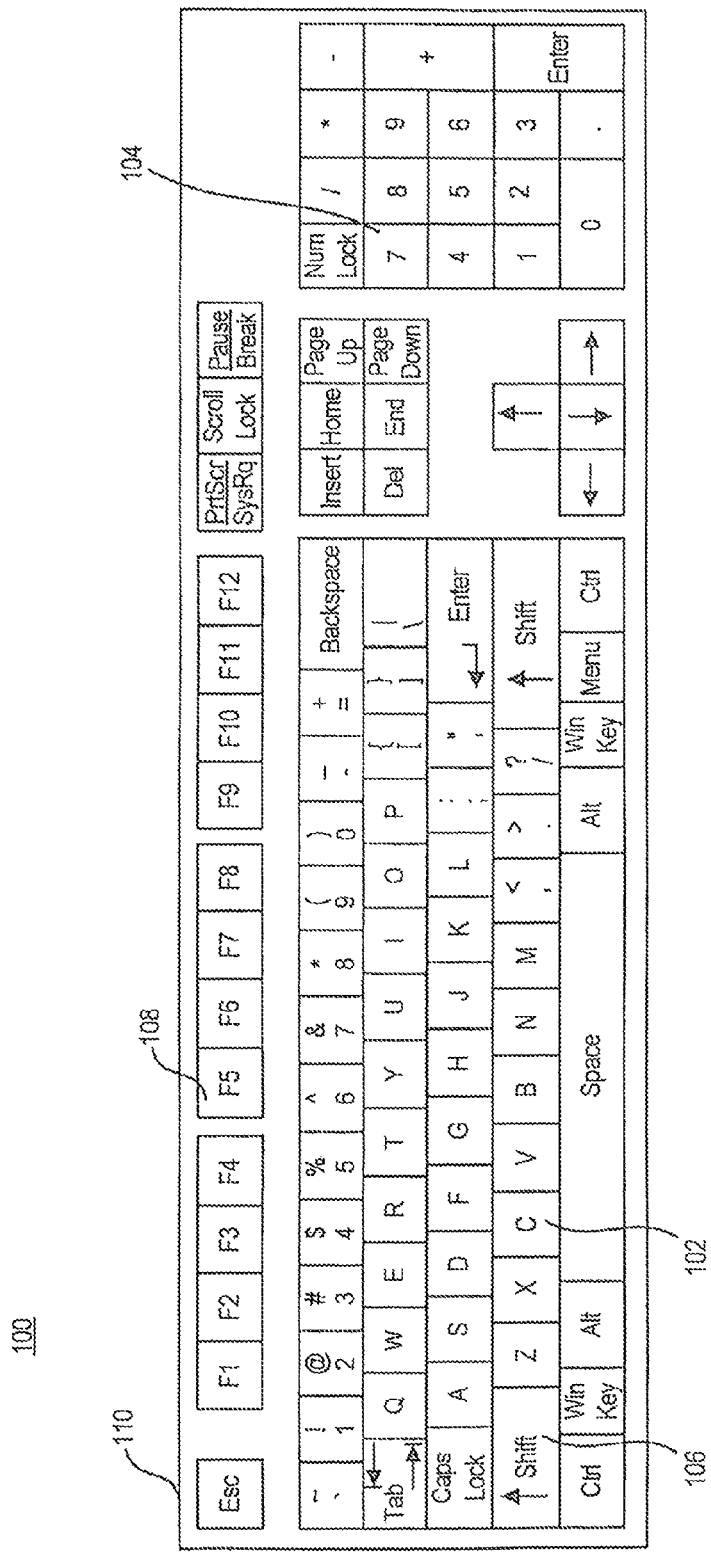
FIG. 6 shows a plan view of a conventional keyboard.

FIG. 1 shows a fairly common present-day key assembly 10. It includes a key head 11 extending above an outer or top surface 12 of conventional keyboard, such as the one shown in FIG. 6. Attached to the key head 11 is a body 11A and a dome 13 having sidewalls 13A and a central bar 14 extending downwardly as shown. In early keyboards, the dome 13 was frequently metallic, however, in newer keyboards the dome 13 is made of a flexible and squeezable plastic material such as polyurethane. Underneath the key assembly 10 there is a plastic circuit panel 20 (shown in FIG. 2). More specifically, the circuit panel is consisted of three thin plastic sheets 36, 37, 38 as shown in FIG. 3. In other words, it contains two sheets 36, 38 with printed circuits and a clear insulating sheet inserted in between. For example, as shown in FIG. 2, each of the sheets 36, 38 may be provided with conductive circuit strips 21 and conductive pads 22, disposed intermittently on the sheet. Contact pads 22 are, in fact, part of the strips 21, and differ from the strips 21 in that they have larger, generally circular shapes. Each contact pad on the top layer 36 is constructed and arranged so that when one of the key assemblies is pushed down, its bar 14 (shown in FIG. 1) lands on a contact pad 22. Then, the contact pad 22 is forced to move down through hole 37A until an electrical contact is established between the pads on the two layers 36, 38. The activation of a contact (e.g., closing of the circuit) is possible because the respective contact pads 22 are disposed exactly in vertical alignment.

The insulating layer 37 is formed with holes 37A at positions matching the positions of the respective contact pads on layers 36, 38. The holes 37A are sized and shaped to allow the contact pads on the upper layer 36 to selectively contact the contact pads on the layer, preventing accidental activation of the keys 40 at all other times.

Activation of one of the key assemblies 10 is sensed by decoder 39, which monitors the strips on 36, 38. In turn, the decoder 39 generates an appropriate command. For example, if the key 10 is dedicated to letter "a", when the key 10 is pushed down or activated, the decoder 39 generates a code causing this letter to be generated on an appropriate device (not shown in the drawings). Of course this is only one mechanism that can be used; many other mechanisms are used with different keyboards as well.

Figure 4A:
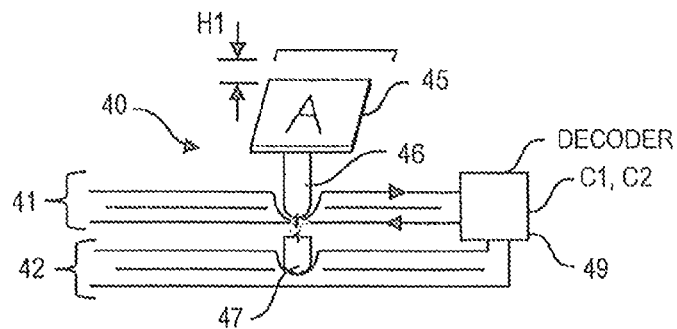
FIGS. 4A, 4B show a side views of a key assembly and two sets of layers cooperating with the key assembly to define a double action key for a keyboard.
Figure 4B:
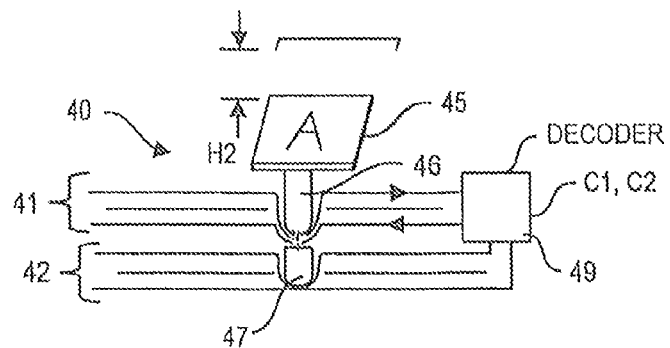

FIGS. 4A and 4B show a first embodiment of the invention and illustrate its basic concept of providing a single key assembly that can be used to perform or trigger two different actions or commands. More specifically, a keyboard (such as the one shown in FIG. 7) according to this invention includes a key assembly 40 and two sets of layers 41, 42. The key assembly 40 includes a head 45 coupled to a first bar 46 and a second bar 47. (The coupling between the head 45 and the second bar 47 has been omitted for the sake of clarity. For example, this coupling may be magnetic). Each of the sets of layers 41, 42 include three layers having the same general structures as the layer set 35 shown in FIG. 3. Initially, bars 46, 47 are positioned so that they are in contact with the top layer of the respective layer sets 41, 42. Biasing means (such as coil springs—not shown) may be used to hold the key head 45 and the bars 46, 47 in this neutral or non-operational position.

For a first operation, key head 45 is pressed down by a first distance H1 causing the upper bar 46 to move down to an intermediate position and generate a first contact between the layers of the first layer set 41, as shown in FIG. 3. This action is sensed by decoder 49 which generates a command C1 in response in a conventional manner.

Alternatively, the had 45 is pressed down by a second distance H2, causing the first bar 46 to move down further than H1 before and pushes down on the second bar 47. During this action, a first contact is made between the layers of set 41 and a second contact is made by the layers of set 42. This second contact is sensed by decoder 49 which in response generates a second command C2. Alternatively, once a contact is sensed between layers of the second set of layers 42, the closing of the contact between the layers of the first layer set is ignored. In other words, the user of keyboard keys 40 can elect at any time to activate each key 40 by pushing it down either by a distance H1 or by a distance H2 thereby causing the keyboard to generate either command C1 or C2. In practice, this operation can be implemented in various ways. For example, the decoder 49 can be configured so that it wafts for a predetermined period after the intermediate position of a key is sensed. If during this time a closing of between the pads of the lower layer is sensed, command C2 is sent. Otherwise command C1 is sent.

Figure 4C:
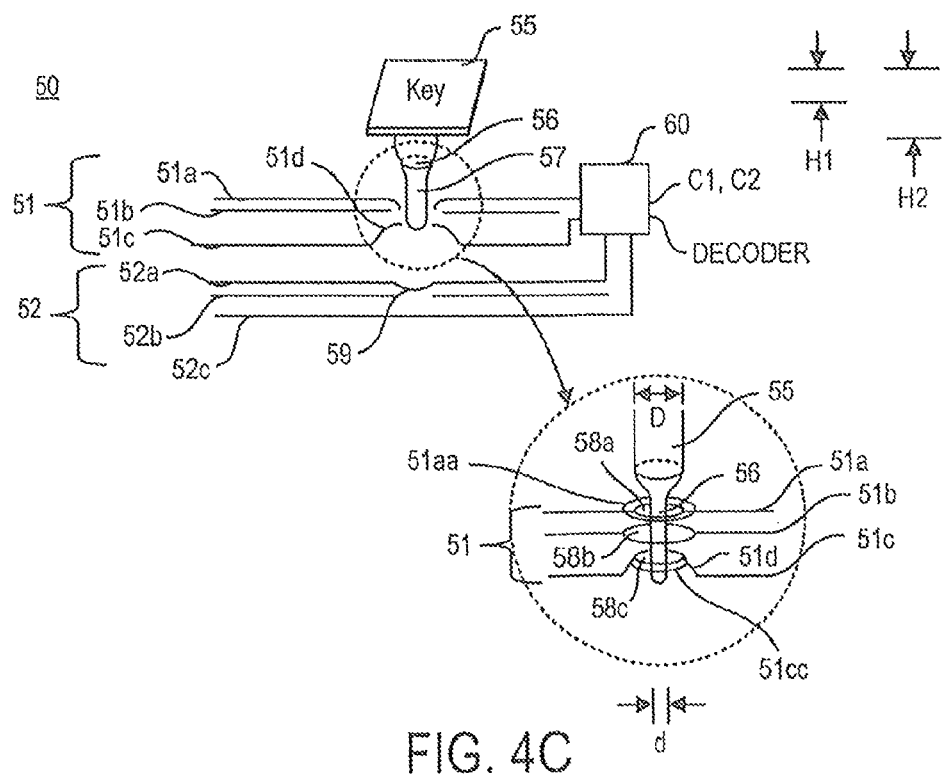
FIG. 4C shows a side view of an alternate embodiment of the invention.

FIG. 4C shows another embodiment of the invention. In this embodiment, a keyboard 50 includes two sets of layers 51, 52. Each key includes a key head 55, attached to a first bar 56 and a second bar 57. Bars 56, 57 can have a round cross section with the bar 56 having a first diameter D and second bar 57 having a smaller diameter d. The layers 51a, 51c have respective holes 58a, 58c sized so that their diameters are smaller than that of bar 56 but larger bar 57, respectively. The intermediate insulating layer 51b has a hole 58b larger than the holes 58a, 58c, so that the layer 51a can move downwardly to make contact with layer 51c. In addition, the bottom-most layer 51c may be formed with a somewhat flexible dome 51d extending upwardly to facilitate contact between contact pad 51aa of the layer 51a and contact pad 51cc of the layer 51c.

Similarly, layer set 52 includes layers 52a, 52b, 52c with top layer 53a having a dimpled pad 59 extending downwardly to facilitate receiving the tip of bar 57. The embodiment of FIG. 4C operates as follows. The key 55 can be depressed by a first amount H1 causing the first bar 56 to push downwardly on the two layers of set 51 together to form a first contact between pads 51aa and 51cc. Decoder 60 senses this contact and generates a corresponding command C1.

Alternatively, the key 55 is depressed by a total distance H2, causing the flexible and squeezable bar 56 to pass cleanly through the holes 58a, 58b, 58c of the first set of layers 51. Then, the bar 56 forces a contact pad on the bottom of layer 52a to contact a contact pad on top of layer 52c, and causing a second command C2 to be generated by decoder 60. As previously discussed, the layers are made of plastic materials and it may be difficult or expensive to make the layers flexible enough to allow a large distention (as shown in FIG. 4B) that is repeated over and over again perhaps thousands or even millions of times. The configuration shown in FIG. 4C alleviates this problem.

Figure 5A:
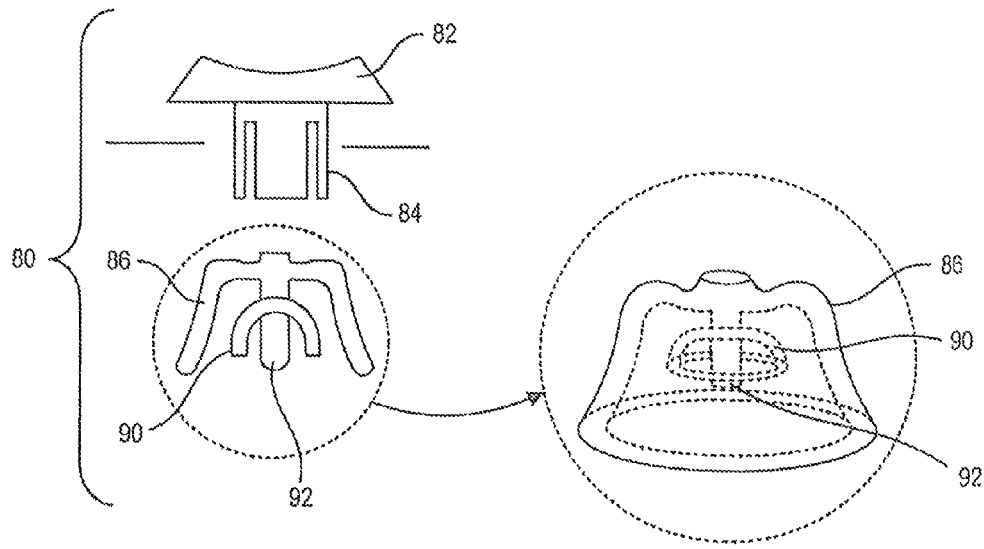
FIG. 5A shows a cross-sectional view of another conventional key assembly.

FIG. 5A shows another prior art keyboard assembly 80. In this embodiment, the key assembly 80 includes a head 82, a body 84 and a flexible bell-shaped dome 86 that provides resiliency (or biasing force) for the key 80. Contained within the dome 86 (and attached thereto) are a second dome 90 and a bar 92. In one embodiment, the dome 86 and its components are made of a flexible and squeezable material.

Figure 5B:
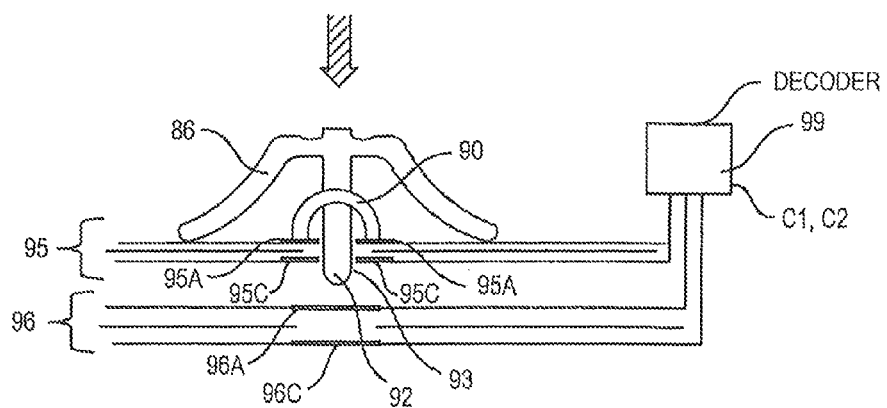
FIG. 5B shows an alternate embodiment of the invention based on the key assembly of FIG. 5A.

FIG. 5B shows how the configuration of FIG. 5A is modified to make a double action keyboard in accordance with this invention. The keyboard contains a plurality key assemblies 80, as well as two layer sets 95, 96. Layer set 95 has a hole 93, with the layer set 95 being formed with respective contact pads 95A, 95C, while layer set 96 is formed with contact pads 96A, 96C. The contact pads are connected to extended conductive strips (not shown) similar to conductors 21 in FIG. 2. When the key head 82 is depressed together with the dome 80, the second dome 90 moves down a first distance and creates a first electrical contact between pads 95A and 95C. This action is sensed by a decoder 99 which in turn generates a first command C1.

When the key 82 is pushed down further, the bar 92 reaches the pad 96A to force it to contact with the pad 96C. This results in a second command C2 being issued.

In all the embodiments described above, the shorter push can be a soft push on the respective key head while the longer push can be a hard push on the key head.

To summarize, the whole purpose of the present invention is to provide a keyboard with a plurality of keys that can have a dual action so that each key can be used to generate two different commands. This configuration may be used in various different ways. For example, in FIG. 6, a keyboard 100 is shown with a conventional layout of keys, including keys 102 for alphanumeric characters, numerical keys 104, control keys, such as shift key 106, functional keys 108, all mounted on a body.

Figure 7:
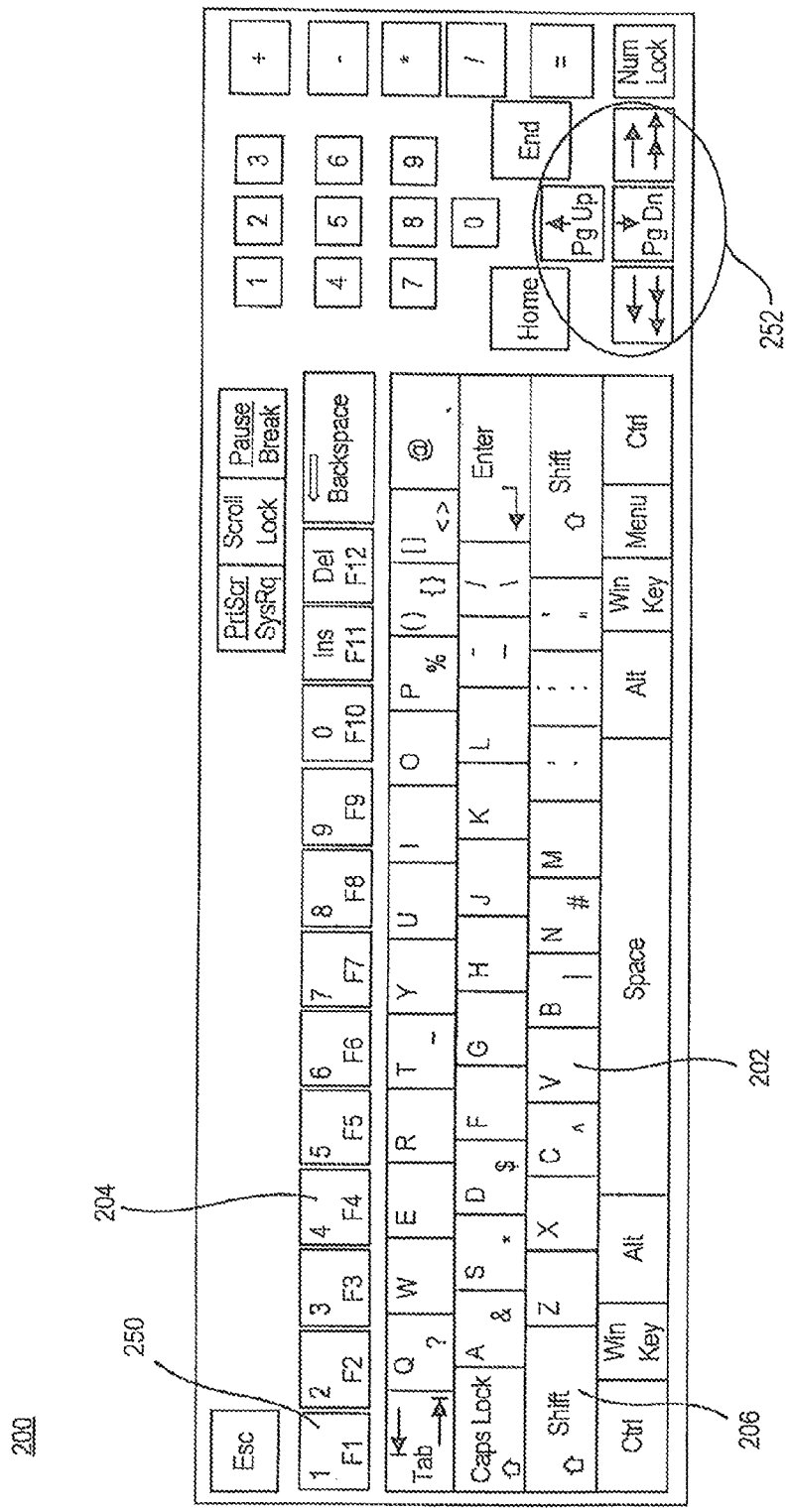
FIG. 7 shows a novel keyboard on which the number of keys have been reduced from 105 to 80 using the double action key assemblies described above.

In accordance with this invention, the keyboard 100 is modified so that at least some of its keys, for example, keys 102 are double action keys. Moreover, the encoder (not shown in FIGS. 6 and 7) is modified so that it can implement either a first or a second option or functionality. The conventional keyboard of FIG. 6 has 105 keys. If all the keys are made double action keys in accordance with this invention, then the number of the keys can be reduced by 50% or additional functionalities can be provided. A novel keyboard shown in FIG. 7 presents a compromise key arrangement or configuration. With this novel keyboard (having 80 keys), the same alphanumeric keys are used for both lower and upper case letters, by pressing the respective key 202, either partially or all the way down.

The function keys 250 (e.g., F1, F2, F3 . . . ) are merged with the numeral keys 204 (e.g., the keys for numerals 1, 2, 3, 4 . . . as shown).

Special characters are obtained by pressing a key 202 all the way down simultaneously with a control key such as the shift key 206 or one of other command keys.

Preferably, the keys for at least some of the special characters or symbols are selected mnemonically, so that they are shared with letters that are suggestive of the respective symbols or characters. For example, the question mark '?' is placed on the Q key and the symbol is obtained by pushing the shift (or another control key) simultaneously. The tilde character '~' is placed on the T key, and so on.

The keys and key combinations for standard alphanumeric as well as some special symbols, punctuation marks and functions are listed below. Again, 'soft push' refers to a short key stroke covering a distance of H1 and a 'hard push' refers to a long key stroke covering a distance of H2.

1. Alphabet Letters
  (a) Lowercase letters a to z are generated by pressing down the respective key partially using a soft push.
  (b) Uppercase letters A to Z are generated using a hard push on the respective key (instead of use of [Shift] key as required on a conventional keyboard).

2. Symbols and Punctuation Marks
  (a) Numerals 1-0 coupled with Function keys are generated using a soft push.
  (b) Functions F1-F10 are obtained by a hard push on the respective numerical keys.
  (c) Some typographical symbols or marks are placed on the mnemonically associated alphabetic key, as illustrated below:

---

& (Ampersand or And): [Shift] key + [A] key;
| (Bar): [Shift] key + [B] key;
^ (Caret or Circumflex): [Shift] key + [C] key;
$ (Dollar sign): [Shift] key + [D] key;
! (Exclamation mark): [Shift] key + [E] key;
(Number): [Shift] key + [N] key;
% (Percent): [Shift] key + [P] key;
? (Question mark): [Shift] key + [Q] key;
* (Star sign or Asterisk): [Shift] key + [S] key;
~ (Tilde): [Shift] key + [T] key;

---

(d) 14 other typographical marks are preferably assigned new positions. They are classed in seven groups, each group having two marks. All the groups are positioned together on the following dedicated keys:

[ ( ) { } ], [ [ ] < > ], [ - _ ], [ / \ ], [ , . ], [ ; : ], [ ' " ], where each box represents a respective key. Among these 14 marks, six marks particularly, to wit, ( ) { }, [ ], < >, are treated somewhat differently, in other words, when a user pushes down the key for [ ], for the example, the symbol [ ] appears instead on a PC monitor. Now, the user can insert any text between the brackets and the right bracket automatically moves to the right of the entered text. When he finishes typing in, he may use → (rightward arrow key) or →→ (double space rightward key; see below) to get out of the bracketed text portion.

If the second bracket is not needed, he can simply delete it by using Delete or Backspace key.

3. Arrows and PgUp and PgDn
  (a) ↑ and ↓ are coupled with PgUp and PgDn, share the same key. However, ↑ and ↓ are made by a soft push, while PgUp and PgDn are generated using a hard push.
  (b) →→ (double space rightward arrow key) and ←← (double space leftward arrow key) are novel symbols that are produced with a hard push of key or → key or ←, respectively (see: keys 252 shown in FIG. 7).

4. Other novel key arrangements are illustrated in FIG. 7.

Numerous modifications may be made to the invention without departing from its scope as defined in the appended claims.

I claim:
1. A keyboard comprising:
  a keyboard body with a top surface;
  a first layer set disposed below said top surface and a second layer set disposed below set first layer set, each layer set including a top and a bottom layer formed with contacts, the layers of said top layer set being formed with a plurality holes in each of said top and bottom layers;

a plurality of key assemblies disposed above said holes, at least some of the key assemblies forming double action keys used to generate at least two different commands as a portion of said key assemblies is pushed through said holes; and a decoder sensing activation of said key assemblies and generating corresponding commands wherein each key assembly includes a key head disposed above said top surface, a first bar supported on said head and cooperating with said first layer set to close a first set of contacts when said key head is pushed down by a first distance, each said key assembly further including a second bar attached to said first bar and arranged to close a second set of contacts on said second layer set when said key head is pushed down by a second distance larger than said first distance, said second bar extending through said holes.

2. The keyboard of claim 1 wherein at least one of said layer sets includes an insulating layer disposed between said top and bottom layers.

3. The keyboard of claim 1 wherein said contacts include conductive pads formed on surfaces of said layers.

4. The keyboard of claim 1 further comprising conductive strips disposed on said layers and connected to said decoder.

5. The keyboard of claim 1 wherein said decoder is configured to generate a first code defining a lower case alphabetic character in response to one command, and to generate a second code defining an upper case alphabetic character in response to a second command.

6. The keyboard of claim 1 wherein said key assemblies are partitioned in a first group defining only upper or lower case alphanumeric characters and a second group defining a symbol mnemonically associated with an alphanumeric character.

7. The keyboard of claim 6 wherein at least one of said key assemblies is assigned to an alphanumeric character and the associated mnemonically associated symbol.

8. A keyboard comprising:
a plurality of key assemblies;
a housing with a top surface; and
a plurality of flat layers extending at least partially below said top surface and being partitioned into a top layer set and a bottom layer set, each layer of said top layer set including a hole defining a key position for each of the key assemblies;
each key assembly including a key head accessible for activation by a user, a first bar attached to said key head and arranged to make top surface contact between the layers of said top layer set when the key head is pushed by the user through a first distance; each key assembly further including a second bar extending from said first bar and through the respective hole and producing bottom surface contact between the layers of the bottom contact set when the head is pushed a second distance by the user.

9. The keyboard of claim 8 wherein at least one of said layer sets includes an insulating layer.

10. The keyboard of claim 8 further comprising conductive pads formed on surfaces of said layers.

11. The keyboard of claim 8 further comprising conductive strips disposed on said layers and connected to said decoder.

12. The keyboard of claim 8 wherein said decoder is configured to generate a first code defining a lower case alphabetic character when one of said keyboard assemblies is pushed through said first distance by the user, said decoder being configured to generate a second code defining an upper case alphanumeric character when said one of said keyboard assemblies is pushed through said second distance by the user.

13. The keyboard of claim 8 wherein said key assemblies are partitioned in a first group defining only upper or lower case alphanumeric characters and a second group defining a symbol mnemonically associated with an alphanumeric character.

14. The keyboard of claim 8 wherein at least one keyboard assembly is assigned to an alphanumeric character and a symbol mnemonically associated with said alphanumeric character.

15. A keyboard comprising:
a keyboard body with a top surface;
a first layer set disposed below said top surface and a second layer set disposed below set first layer set, each layer set including a top and a bottom layer formed with contacts, the layers of said top layer set being formed with a plurality holes in each of said top and bottom layers;
a plurality of key assemblies disposed above said holes, at least some of the key assemblies forming double action keys used to generate at least two different commands as a portion of said key assemblies is pushed through said holes; and
a decoder sensing activation of said key assemblies and generating corresponding commands, said decoder being configured to generate a first code defining a lower case alphabetic character in response to one command, and to generate a second code defining an upper case alphabetic character in response to a second command.

16. A keyboard comprising:
a keyboard body with a top surface;
a first layer set disposed below said top surface and a second layer set disposed below set first layer set, each layer set including a top and a bottom layer formed with contacts, the layers of said top layer set being formed with a plurality holes in each of said top and bottom layers;
a plurality of key assemblies disposed above said holes, at least some of the key assemblies forming double action keys used to generate at least two different commands as a portion of said key assemblies is pushed through said holes; and
a decoder sensing activation of said key assemblies and generating corresponding commands;
wherein said key assemblies are partitioned in a first group defining only upper or lower case alphanumeric characters and a second group defining a symbol mnemonically associated with an alphanumeric character.

* * * * *